United States Patent
Mikati et al.

(10) Patent No.: US 11,075,561 B2
(45) Date of Patent: Jul. 27, 2021

(54) WOUND ROTOR SYNCHRONOUS ELECTRIC MACHINE

(71) Applicant: NISSAN MOTOR CO., LTD., Yokohama (JP)

(72) Inventors: Karim Mikati, Paris (FR); Emmanuel Motte, Saint Jean du Cardonnay (FR); Fabrice Bernardin, Vaux sur Seine (FR)

(73) Assignee: NISSAN MOTOR CO., LTD., Yokohama (JP)

( * ) Notice: Subject to any disclaimer, the term of this patent is extended or adjusted under 35 U.S.C. 154(b) by 84 days.

(21) Appl. No.: 16/463,909

(22) PCT Filed: Nov. 20, 2017

(86) PCT No.: PCT/EP2017/079726
§ 371 (c)(1),
(2) Date: May 24, 2019

(87) PCT Pub. No.: WO2018/095842
PCT Pub. Date: May 31, 2018

(65) Prior Publication Data
US 2019/0296600 A1 Sep. 26, 2019

(30) Foreign Application Priority Data
Nov. 25, 2016 (FR) ...................................... 1661522

(51) Int. Cl.
*H02K 3/51* (2006.01)
*H02K 1/26* (2006.01)
*H02K 9/193* (2006.01)

(52) U.S. Cl.
CPC .................. *H02K 3/51* (2013.01); *H02K 1/26* (2013.01); *H02K 9/193* (2013.01)

(58) Field of Classification Search
CPC ............ H02K 3/51; H02K 1/26; H02K 9/193; H02K 7/00; H02K 3/50; H02K 7/04; H02K 3/28; H02K 9/04
(Continued)

(56) References Cited

U.S. PATENT DOCUMENTS 4,409,502 A * 10/1983 McCabria ................ H02K 9/06
310/165
6,133,668 A * 10/2000 Huang ...................... H02K 3/51
29/598

(Continued)

*Primary Examiner* — Tran N Nguyen
*Assistant Examiner* — Leda T Pham
(74) *Attorney, Agent, or Firm* — Foley & Lardner LLP

(57) ABSTRACT

A wound rotor (1) has a structure defining a circumferential alternation of teeth and grooves. The teeth respectively receives longitudinal windings. The rotor (1) has longitudinal ends (17, 17') and the windings defining, at the longitudinal ends of the rotor (1), protruding coil heads (40). A collar (10, 10') for mechanically holding the windings is installed at one of the longitudinal ends (17, 17') of the rotor (1) so as to define a central opening (101, 101'). A nozzle (21, 21') projects a liquid coolant through the central opening (101, 101') onto the coil head (40). The collar (10, 10') has an escape duct (11, 11') allowing escape of the liquid coolant projected onto the coil heads (40) to an outside of the collar (10, 10'). A longitudinal end of the collar (10, 10') has a constant reduction in an outer diameter.

7 Claims, 3 Drawing Sheets

(58) Field of Classification Search
USPC .............................................. 310/52–64, 270
See application file for complete search history.

(56) References Cited

U.S. PATENT DOCUMENTS

| | | | |
|---|---|---|---|
| 2004/0164627 A1* | 8/2004 | Tornquist | ............... H02K 3/527 310/59 |
| 2008/0020696 A1* | 1/2008 | Van Gansen | ............ H02K 5/20 454/126 |
| 2013/0106211 A1* | 5/2013 | Holzner | ................... H02K 3/38 310/62 |

* cited by examiner

WOUND ROTOR SYNCHRONOUS ELECTRIC MACHINE

The invention relates to a wound rotor synchronous electric machine.

In the field of synchronous electric machines, the rotors are generally either permanent magnet rotors or wound rotors.

Wound rotors have many advantages, in particular the improvement to the engine output by optimizing both the rotor current and the stator currents, and allowing a simplified speed adjustment by acting directly on the currents of the windings of the rotor.

However, one well-known drawback of wound rotors is the heating produced by the passage of the electric current in the rotor windings.

Knowing that about 30% to 40% of the heating of the windings of a wound rotor is concentrated near the coil heads, located at the longitudinal ends of the rotor, one known cooling method consists of spraying oil, or any other dielectric and heat transfer coolant, on the coil heads.

However, the coolant sprayed at the longitudinal ends of the rotor builds up on the mechanical maintaining collars of the windings.

Indeed, in order to guarantee firm holding of the rotor structure, in particular when the rotor is rotated at high speeds, mechanical maintaining collars are installed at each longitudinal end of the rotor, preventing the stack of sheets of the structure from becoming dislocated under the effect of the centrifugal force.

Thus, these collars form, at each end of the rotor, a protruding hollow cylinder, defining a central opening leading to the rotor coil heads.

When a coolant is sprayed on the coil heads, these collars then retain the liquid, which in particular builds up on the inner circumferential walls of the central opening formed by the protruding collar of the rotor.

Yet the coolant thus built up in the collar, and under the effect of the centrifugal force, creates a smooth surface against the inner circumferential wall of the collar, which, by capillarity, infiltrates the air gap.

One problem is that the coolant present in the air gap creates friction effects between the stator and the rotor, which decreases the efficiency of the electric machine.

There is therefore a need for a solution making it possible to improve the cooling of the rotor windings of a wound rotor synchronous machine and not having the drawbacks of the prior art.

A wound rotor is proposed comprising a structure defining a circumferential alternation of teeth and grooves, each tooth receiving a longitudinal winding intended to produce a rotor pole; each winding defining, at each longitudinal end of the rotor, a protruding coil head, said rotor also comprising a shaft passing through said structure along a longitudinal direction, said rotor being capable of being cooled by a coolant projected onto said coil heads, said rotor further comprising at least one collar for mechanically holding said rotor windings, installed at a longitudinal end of the rotor so as to define a central opening that opens out onto the coil heads, characterized in that said collar has at least one escape duct capable of allowing the escape of said coolant projected into the central opening onto said coil heads.

Thus, due to the use of an escape duct of the coolant into the collar, it is possible to force the escape of the liquid in a direction such that said oil does not engage in the air gap of the machine. In other words, the escape duct makes it possible to control the escape of the coolant that was previously projected inside the collar, which makes it possible to optimize the efficiency of the electric machine, in particular by preventing oil from infiltrating the air gap of the electric machine.

Advantageously and non-limitingly, the collar is mounted forcibly at a longitudinal end of the structure up to a stop of the structure. Thus, it is possible to mount the collar relatively robustly and simply on the structure of the rotor.

Advantageously and non-limitingly, said escape duct is formed by an orifice passing radially through said collar. Thus, the escape duct can be made relatively inexpensively, by arranging an orifice directly in the collar, for example by piercing, or during the molding of the part.

Advantageously and non-limitingly, said collar comprises at least two diametrically opposite ducts. Thus, it is possible to improve the escape of the coolant and to optimize the expulsion flow rate in particular toward the stator coil heads, also called "stator coils", which improves the general cooling of the electric machine.

Advantageously and non-limitingly, said collar comprises eight ducts, and its longitudinal end has a constant reduction in its outer diameter. This makes it possible to obtain a better expulsion, in particular a better circumferential distribution, but also longitudinal distribution of the expulsion. In particular, the eight ducts are distributed regularly in the circumference of the collar, and the longitudinal end of the collar has a planar incline so as to allow a rapid escape of the liquid when the rotor is rotated at high speeds.

The invention also relates to an electric machine comprising a wound rotor as previously described and means for projecting a coolant on said longitudinal end of the rotor receiving said maintaining collar.

Advantageously and non-limitingly, the wound rotor is installed in a stator comprising a plurality of stator windings each defining, for each longitudinal end of the stator, a coil head of the stator, said ducts of the collar of the wound rotor being configured to open out near the coil heads of the stator windings, such that when the coolant escapes through the ducts of the collar, the coolant is projected directly on the coil heads of the stator coils.

Other specificities and advantages of the invention will emerge upon reading the description below of one particular embodiment of the invention, provided for information but non-limitingly, in reference to the appended drawings, in which.

Figure 1:
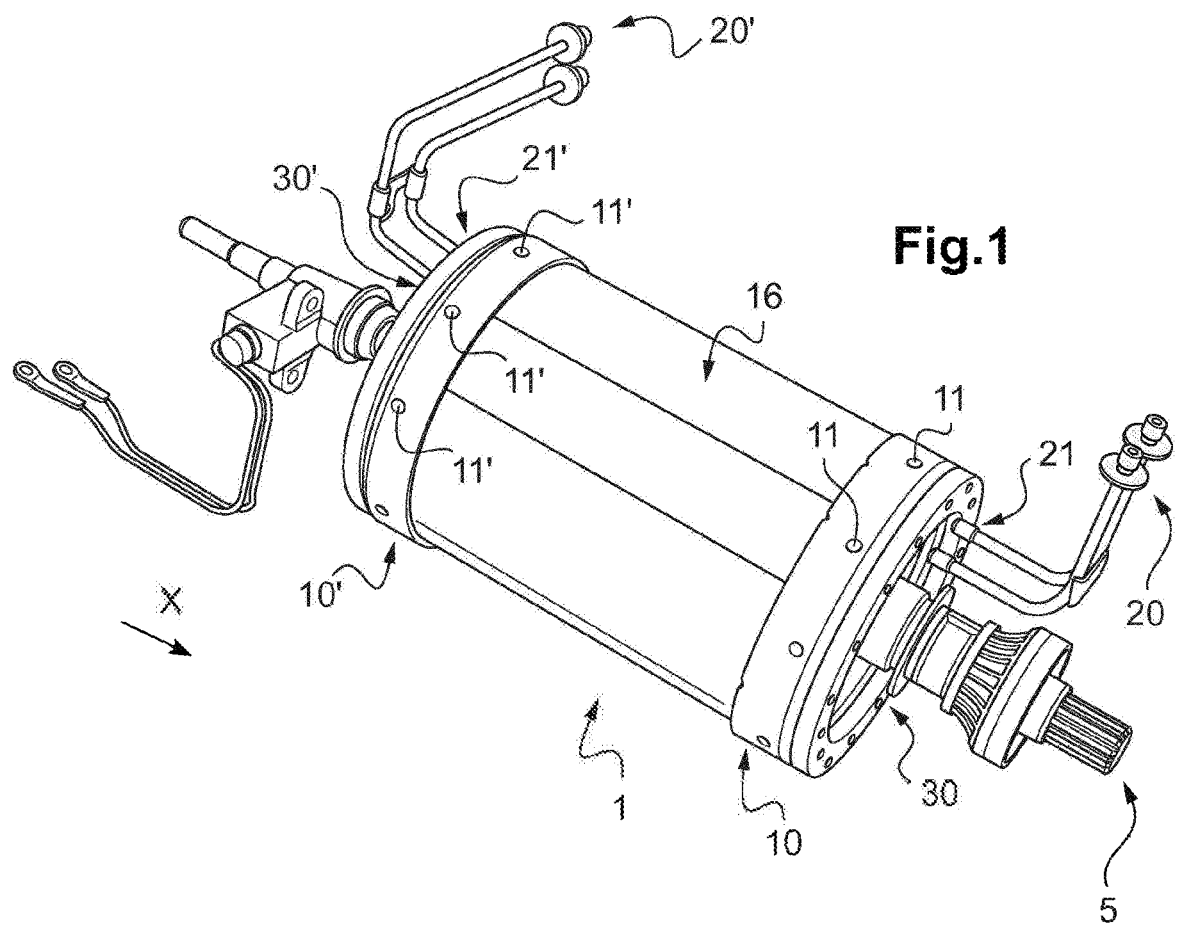
FIG. 1 is a perspective view of a wound rotor according to one embodiment of the invention.
Figure 2:
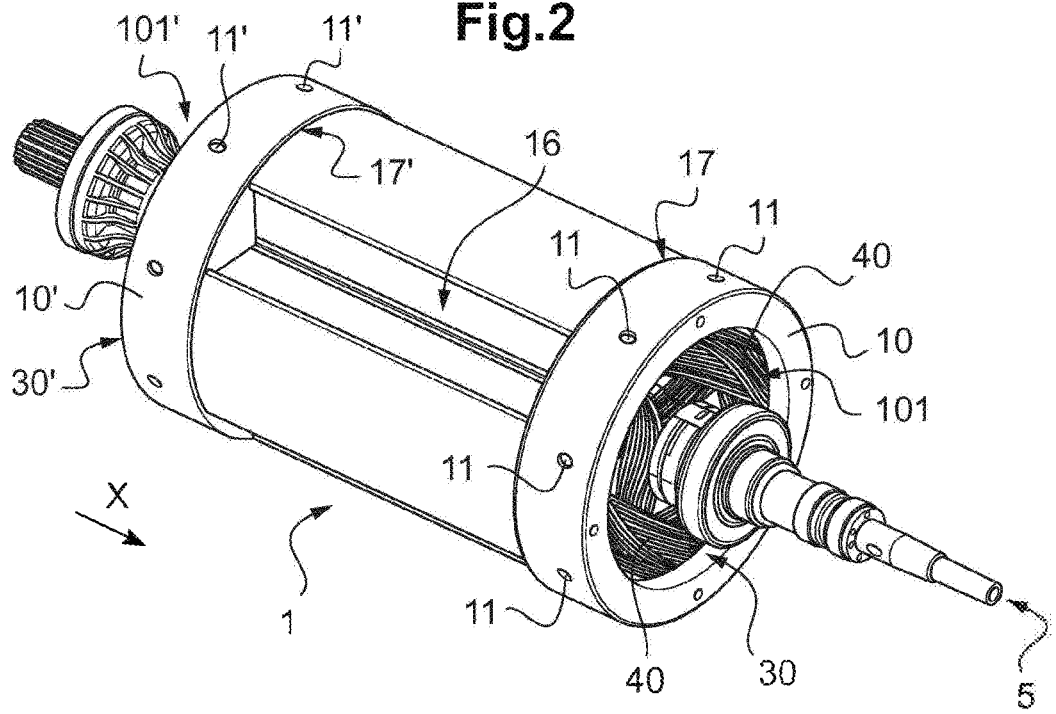
FIG. 2 is another perspective view of the wound rotor according to the embodiment of the invention of FIG. 1.

FIGS. 1 and 2 relate to a same embodiment of the invention, and will be discussed at the same time.

Figure 4:
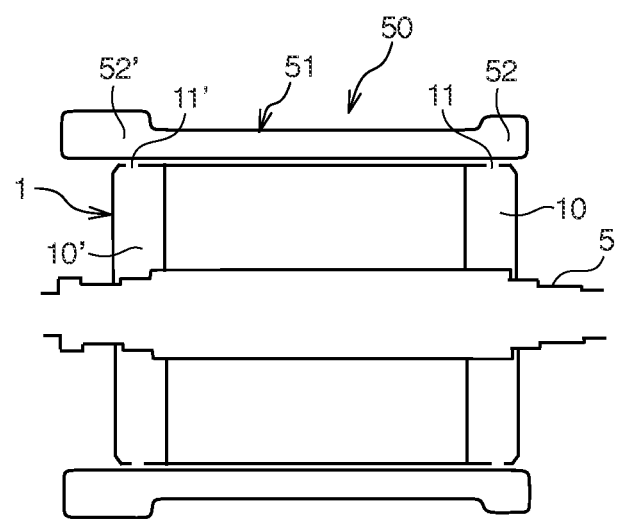
FIG. 4 is a schematic longitudinal sectional view of the wound rotor and a stator.

A synchronous electric machine comprises a wound rotor 1 installed in a stator, not 50 shown in FIG. 4.

The wound rotor 1, also called rotor 1, comprises a longitudinal structure 16, made of a stack of sheet metal parts, passed through in its length by a shaft 5.

Thus, the shaft 5, which is rotatably coupled to the structure 16, extends in a longitudinal direction X. This same longitudinal direction X defines the main axis X of revolution of the rotor 1.

The structure 16 defines a circumferential series of teeth and notches.

Rotor windings are installed in the notches so as to surround the teeth along a longitudinal winding.

The rotor 1 thus comprises a plurality of windings extending along the longitudinal direction X.

The rotor windings define coil heads 40 at each longitudinal end 30, 30' of the rotor 1.

All of the coil heads 40 at one longitudinal end 30, 30' of the rotor 1 are thus called the coil.

In order to cool the windings of the rotor 1 heating up under the effect of the passage of the current, a cooling system comprises an oil circulation circuit 20, 20' including, for each longitudinal end 30, 30' of the rotor 1, cooling nozzles 21 and 21'.

In this embodiment, for each longitudinal end 30, 30' of the rotor, two cooling nozzles 21, 21' are installed.

However, the invention is not limited to two nozzles per longitudinal end 30, 30'. It is also possible to provide a single nozzle for projecting a coolant per longitudinal end 30, 30', or more than two cooling nozzles per longitudinal end 30, 30', depending on the heating of the rotor windings.

It is also possible to provide cooling at a single longitudinal end 30, 30' of the rotor 1.

The projection nozzles 21, 21' are oriented so as to allow the projection of the coolant, here the coolant oil, on the coil heads 40 of the rotor 1 corresponding to the end 30, 30' at which the nozzle 21, 21' is installed.

The projection may for example consist of spraying oil in the form of fine droplets.

In order to keep the rotor windings stationary relative to the structure 16 of the rotor 1 when the rotor 1 is rotated, in particular in order to withstand the centrifugal force, a mechanical maintaining collar 10, 10' is installed at each longitudinal end 30, 30' of the rotor 1.

The maintaining collar 10, 10' is mounted on the structure 16 of the rotor 1. It may in particular be engaged forcibly, up to a longitudinal stop 17, 17' of the structure 16, and optionally fixed, at the longitudinal end 30, 30' of the rotor 1, around the structure 16, so as to encircle the rotor windings near the coil heads 40.

Thus, the maintaining collar 10, 10' extends circularly, protruding longitudinally at each longitudinal end 30, 30' of the rotor 1 such that the collar forms, in part, a protruding end of the rotor in the form of a hollow cylinder defining a central opening 101, 101' opening on the coil heads 40.

In other words, when the collars 10, 10' are installed at the longitudinal ends of the rotor 1, they define a central opening 101, 101' corresponding to a substantially cylindrical recess emerging on the coil heads 40 from the corresponding longitudinal end 30, 30' of the rotor 1.

The projection nozzles 21 and 21' are installed such that the oil is projected inside the central opening 101, 101' of the corresponding collar 10, 10'.

Thus, when the rotor 1 is rotated, the projected oil fills the inner space of the collar 10, 10', building upon the inner circumferential wall of the collar 1.

Yet the oil projected in the central opening 101, 101' of the collar 10, 10' can infiltrate between the collar 10, 10' and the structure 16, at the junction between the stop 17, 17' of the structure and the corresponding collar 10, 10', which may cause oil to flow in the air gap of the electric machine.

Such a flow is not desirable, since it creates friction forces that are detrimental to the efficiency of the electric machine.

In order to prevent oil built up in the central opening 101, 101' of the collar 10, 10' from infiltrating the junction between the stop 17, 17' of the structure 16 of the rotor 1 and the collar 10, 10', for each collar 10, 10', at least one, and preferably a plurality of escape ducts 11, 11' are made.

Each escape duct 11, 11' corresponds to an orifice 11, 11' made in a circumferential wall of the collar 10 on its longitudinal protruding portion of the structure 16 of the rotor 1.

The orifices 11, 11' are radial through orifices, which have a sufficient diameter to allow the oil to flow from the central opening 101, 101' of the collar 10, 10' toward the outside of the collar 10, 10'.

These orifices 11, 11' facilitate not only the escape of the oil from the central opening 101, 101' of the collar 10, 10', but also prevent the formation of a smooth surface between the collar 10, 10' and the corresponding stop 17, 17' of the structure 16, which reduces the risk of capillarity effect causing oil to infiltrate the air gap.

In particular, the ducts 11, 11' are configured to expel the oil toward the coil heads 52, 52' of the stator 50.

The orifices 11, 11' are thus installed on the collars 10, 10', along the longitudinal direction of the rotor 1, such that they are across from, or near, the stator coil heads 52, 52', so as to allow the oil to escape from the collar 10, 10' directly on the stator coil heads 52, 52'.

Thus, it is possible to increase the oil projection speed fields on the coils 51 of the stator 50, which improves their cooling and therefore the efficiency of the electric machine.

In this embodiment, each collar 10, 10' comprises eight escape ducts 11, 11', in other words eight radial through orifices 11, 11'.

The radial through orifices 11, 11' are distributed regularly over the circumference of the collars 10, 10'.

Figure 3:
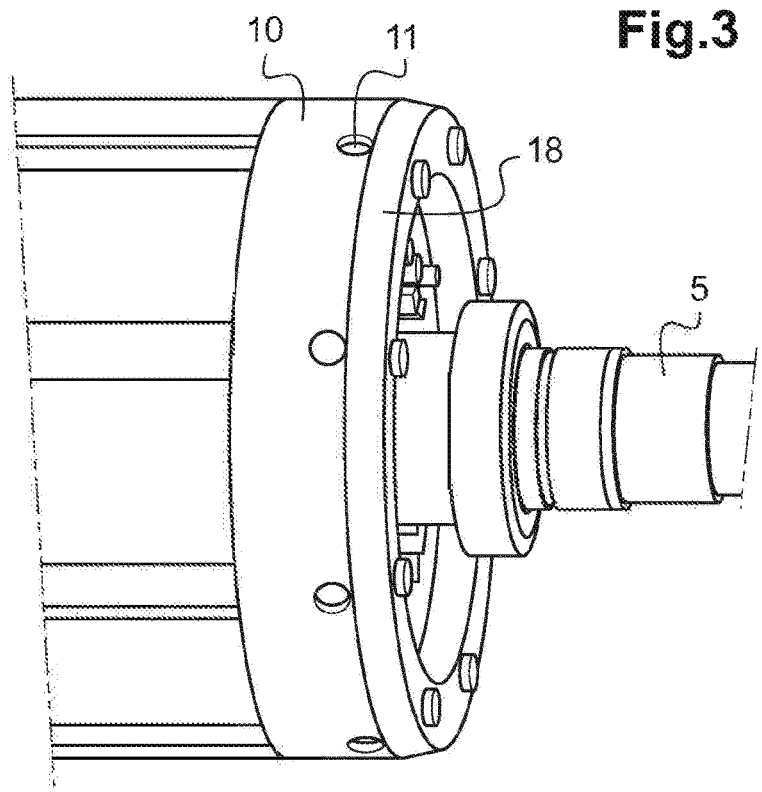
FIG. 3 is a view of the collar of the wound rotor according to an alternative embodiment of the invention of FIGS. 1 and 2

FIG. 3 shows an alternative embodiment of the collars 10, 10' of the rotor 1. Only the collar 10 is shown for greater clarity, the collar 10' being modified similarly. In this alternative embodiment of the invention, the collar 10 has a constant reduction in its outer diameter over a longitudinal end 18 of the collar 10. This preferably planar reduction allows the oil present on this end of the collar, located immediately after the orifices 11, 11' in the longitudinal direction X, to escape more easily outside the air gap when it has not been expelled through these orifices 11, 11'.

It is possible, using this device, to obtain a gain regarding the resistive torque of the electric machine of about 15% relative to the known prior art.

The invention is not limited only to oil, but to any dielectric heat transfer coolant suitable for cooling an electric machine.

The number of orifices 11, 11' for each collar 10, 10' may vary based on the quantity of oil to be expelled per unit of time.

Thus, based on characteristics of the rotor 1, its sizing, and the quantity of oil projected on each coil head 40, it is possible to provide for increasing the number of orifices 11, 11' or increasing the diameter of each orifice to control the escape flow of the oil from the collar 10, 10'.

In particular, the orifices 11, 11' of a same collar 10, 10' can have identical or different diameters.

The collar 10, 10' is formed by a hammered sheet, or by molding, or by mass machining. The material used is for example an aluminum or steel alloy. It is preferably made from a sheet of hammered aluminum alloy to lighten the weight of the rotor.

The invention claimed is:

1. A wound rotor comprising a structure defining a circumferential alternation of teeth and grooves, the teeth respectively receiving longitudinal windings each of longitudinal windings being configured to produce a rotor pole; the rotor having longitudinal ends and the windings defining, at the longitudinal ends of the rotor, protruding coil heads, the rotor also comprising a shaft passing through the structure along a longitudinal direction, at least one collar configured for mechanically holding the windings, installed at one of the longitudinal ends of the rotor so as to define a central opening that opens out onto the coil heads, and a nozzle configured to project a cooling liquid through the central opening onto a coil head, wherein the collar has at least one escape duct capable of allowing escape of the cooling liquid projected onto the coil heads to an outside of the collar, the escape duct being made up of an orifice radially passing through the collar, and a longitudinal end of the collar having a constant reduction in an outer diameter thereof.

2. The wound rotor according to claim 1, wherein the structure has a longitudinal end and the collar is mounted forcibly at the longitudinal end of the structure up to a stop of the structure.

3. The wound rotor according to claim 1, wherein the collar comprises at least two diametrically opposite escape ducts.

4. The wound rotor according to claim 1, wherein the collar comprises eight escape ducts.

5. The wound rotor according to claim 1, wherein the collar is made from a hammered aluminum metal sheet.

6. An electric machine comprising the wound rotor according to claim 1.

7. The electric machine according to claim 6, wherein the wound rotor is installed in a stator comprising a plurality of stator windings each defining, for each longitudinal end of the stator, a coil head of the stator, said at least one escape duct of the collar of the wound rotor being configured to open out near the coil heads of the stator windings, such that when the cooling liquid escapes through the said at least one escape duct of the collar, the cooling liquid is projected directly on the coil heads of the stator.

* * * * *